United States Patent

[11] 3,539,053

[72] Inventors William J. Lado
Rome, and
John F. Hefferin, Port Washington, New York
[21] Appl. No. 739,279
[22] Filed June 24, 1968
[45] Patented Nov. 10, 1970
[73] Assignee Pettibone Corporation
a corporation of Delaware

[54] SWINGING CRANE WITH HIGH MECHANICAL ADVANTAGE BRAKING
6 Claims, 4 Drawing Figs.
[52] U.S. Cl. ........................................... 212/69,
74/425; 192/4
[51] Int. Cl. ............................................ B66c 23/84
[50] Field of Search .......................................... 212/66-
—69; 74/425; 192/4; 254/170; 188/(Consulted)

[56] References Cited
UNITED STATES PATENTS

| 2,017,083 | 10/1935 | Willink | 192/4 |
|---|---|---|---|
| 2,091,225 | 8/1937 | Eaton | 254/170 |
| 2,250,586 | 7/1941 | Lamond | 192/4 |
| 2,428,163 | 9/1947 | Hubbard | 212/69 |
| 2,557,958 | 6/1951 | Fitzsimmons | 192/4 |
| 3,298,462 | 1/1967 | Morris | 254/184 |

FOREIGN PATENTS

| 105,647 | 2/1927 | Germany | 212/69 |

Primary Examiner—Harvey C. Hornsby
Attorney—Darbo, Robertson and Vandenburgh

ABSTRACT: Smooth and safely adequate braking for a swinging boom of a crane is provided by a disc brake geared to the rotating structure with high mechanical advantage including a worm gear slightly too low in ratio, and too high in thread lead angle, to be self-locking. The disc brake is hydraulic, applied by foot-controlled master cylinder. The hydraulic brake can be locked in braking condition hydraulically by a tight-closing valve actuated manually.

Patented Nov. 10, 1970

Inventors
William J. Lado
John F. Hefferin
By Darbo, Robertson & Vandenburgh
Attorneys Patented Nov. 10, 1970

Inventors
William J. Lado
John F. Hefferin
By Darbo, Robertson & Vandenburgh
Attorneys

3,539,053

SWINGING CRANE WITH HIGH MECHANICAL ADVANTAGE BRAKING

BACKGROUND OF THE INVENTION

The invention of which public dissemination is offered in the event that a patent issues thereon, relates to an improved apparatus for smoothly and reliably slowing and stopping the slewing action of a swinging crane. In recent years the advent of longer telescopic booms and the development of swinging cranes with higher tonnage capacities have been accompanied by increasingly greater peak angular momentum of the swinging crane. Hence, the problem of braking the slewing motion, i.e. swinging side-to-side, is becoming more and more severe. In spite of extremely high angular momentum the braking must be smooth and safely adequate. It will be appreciated that the smoothness of the braking action is particularly important in preventing the hanging load from becoming a swinging pendulum.

SUMMARY OF THE INVENTION

Smooth and safely adequate braking for a swinging boom of a crane is provided by a brake geared to the rotating structure with high mechanical advantage. The gearing employed in accordance with this invention provides a gear ratio between about 8 to 1 and 30 to 1 preferably in the neighborhood of 15 to 1 between the input and output of the braking mechanism, and the drive gearing mechanism. It is essential however that the mechanical advantage not be high enough to provide self-locking and that the crane turntable be capable of smooth coasting. In a preferred embodiment of this invention, the gearing by which the brake is geared to the rotating structure is the same mechanism by which the rotating structure is driven. Heretofore, the driving mechanisms have generally employed gear ratios sufficiently high to be self-locking, e.g. 40 to 1 and higher. Such mechanisms could be operated only be a driving force applied to one end, i.e. motor end, of the gear train. This was especially true when worm gears having high gear ratio and relatively shallow lead angles constituted part of the driving mechanism. Hence, while the turntable could be smoothly turned by the action of a driving motor through the gear train, the gear train could not be rotated as a result of forces applied to the gear train by the turntable. Consequently, in such systems the turntable could not coast because of the self-locking characteristics of the turntable driving mechanism; or if they could coast at all, due to momentum at the high-speed end of the gearing, the coasting was much too limited for present needs. Hence, as soon as the operation of the driving motor ceased the turntable tended to jerk to a stop because of the self-locking characteristics.

DESIGNATION OF FIGURES OF THE DRAWINGS

DESCRIPTION OF PREFERRED EMBODIMENT

Although the following disclosure offered for public dissemination in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
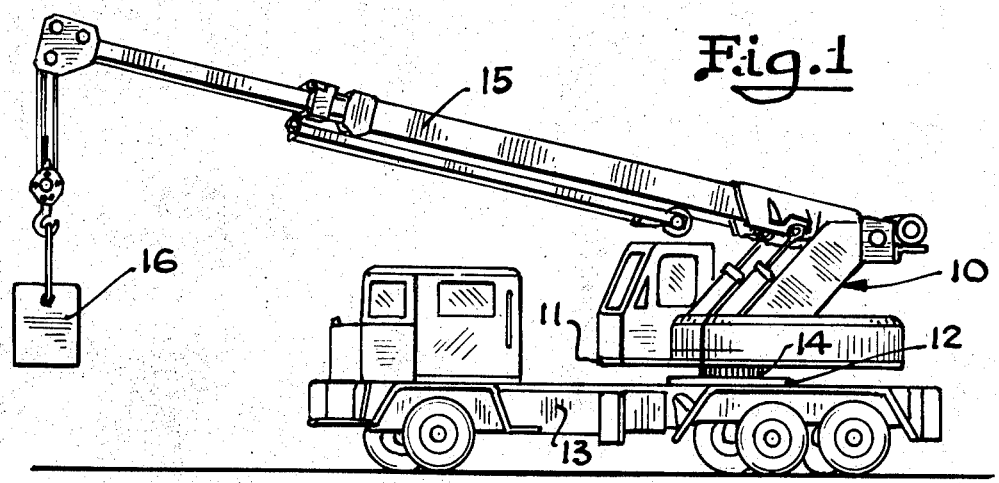
FIG. 1 is a perspective view of a truck-borne swinging crane having a telescopic boom, with which this invention is highly advantageous.

FIG. 1 illustrates a truck-borne crane 10 having a turntable 11 mounted on a fixed base plate 12 which is supported by the truck chassis 13. The stationary gear 14 is part of the mechanism used for rotating or slewing the turntable 11. The crane illustrated in FIG. 1 has a telescopic boom 15 which is shown in a somewhat contracted condition, supporting the load 16. The equipment used to raise and lower or extend or contract the boom does not constitute part of the invention, and hence will not be discussed further.

Figure 2:
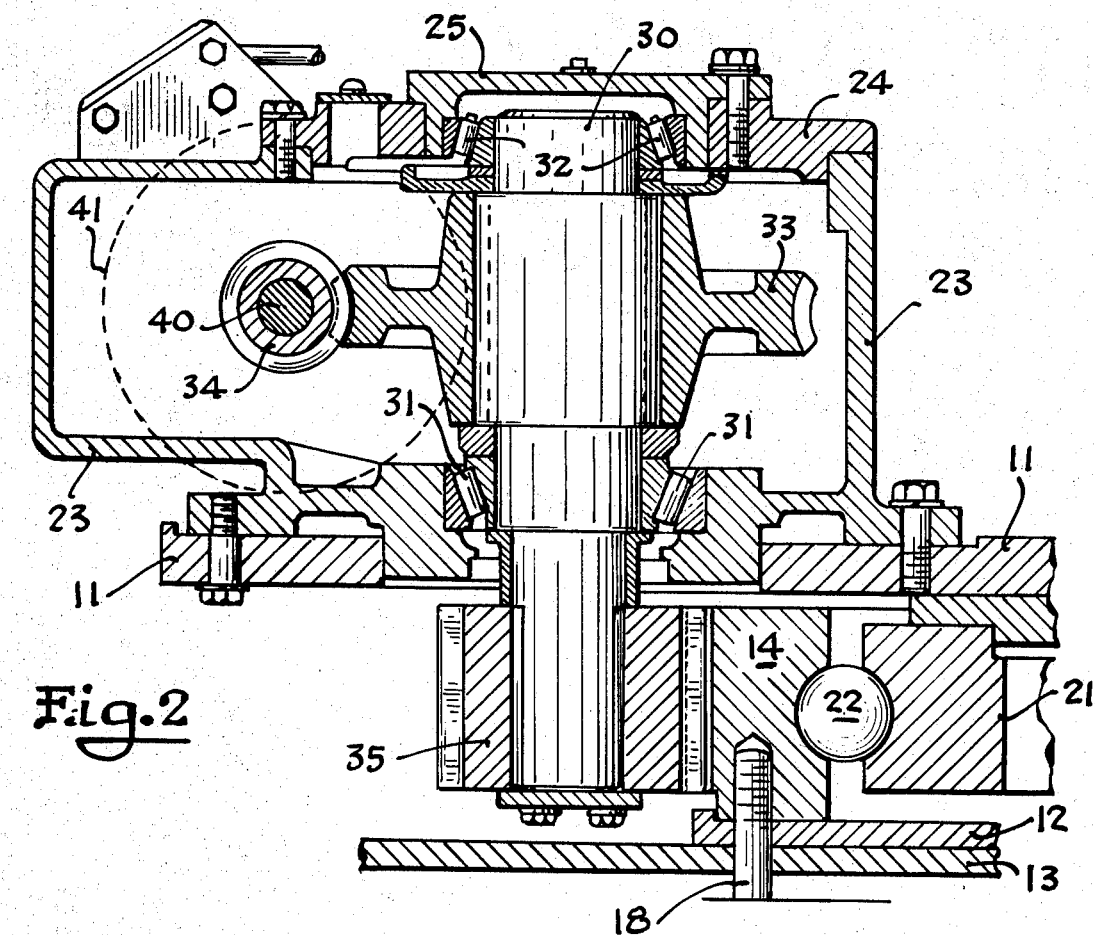
FIG. 2 is a vertical cross-sectional view taken approximately along the line 2–2 in FIG. 3, illustrating key elements of this invention.

In FIG. 2 attachment of the gear 14 and the base plate 12 to the chassis 13 is illustrated schematically by the inclusion of bolt means 18. Hence in FIG. 2 only parts secured by this bolt, namely the gear 14, and the base plate 12 are fixed, that is, stationary, with respect to the truck chassis 13. The elements mounted on turntable 11 and turntable bearing means or race ring 21 move with the crane boom whenever the boom 15 is in slewing motion. The bearing 22 schematically illustrates supporting means which provide both upward and downward support of the turntable bearing ring 21 while permitting the turntable bearing ring to rotate with the boom. Gear box 23 is fixed to turntable 11. Gear box 23 is closed by cover 24 and upper bearing support element 25. The stepped drive shaft 30 is mounted on suitable lower bearings 31 and upper bearings 32. Worm wheel gear 33 is fixed to shaft 30 within gear box 23 and spur gear 35 is fixed to the shaft 30 near its lowermost end outside of the gear box 23 in such a position that the spur gear 35 meshes with stationary gear 14. Worm wheel gear 33 meshes with worm 35 fixed to shaft 40. The brake disc 41 is also fixed to shaft 40 and is situated outside of the gear box 23.

Figure 3:
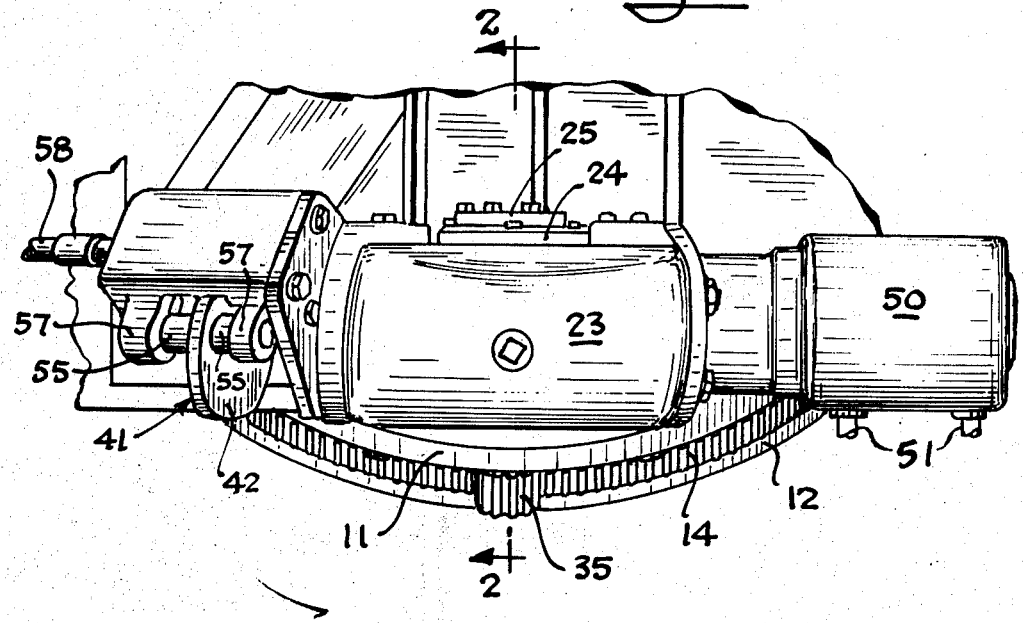
FIG. 3 is a fragmentary perspective view showing relative positions of key features of this invention.

FIG. 3 further illustrates the spatial relationship between key elements of this invention. The hydraulic motor 50 is operated by the pressure of hydraulic fluid supplied to and discharged therefrom by hydraulic lines 51 thereby rotating shaft 40 which is not visible in FIG. 3, but which extends through the gear box 23 to the brake disc 41, which is fixed thereto. Rotation of shaft 40 inside the gear box 23 drives worm wheel gear 33 (see FIG. 2) and with it vertical shaft 30 to which spur gear 35 is fixed. The relative position of spur gear 35 is also illustrated in FIG. 3 in which it is apparent that spur gear 35 meshes with circular stationary gear 14. As the hydraulic motor 50 causes rotation of shaft 40, the result is that the brake disc 41, worm wheel gear 33, vertical shaft 30, and spur gear 35 are driven thereby. As will be appreciated from FIG. 3 rotation of spur gear 35 causes the turntable 11 to which gear box 33 is attached to move along the circumference of the circular gear 14. At the center of circular gear 14 is a vertical axle (not shown since it does not constitute part of the invention) around which turntable 11 rotates.

Also visible in FIG. 3 are brake friction elements 55 which are brought to bear against the lateral surfaces 42 of brake disc 41. The pressure supplied from time to time by the friction elements 55 is generated by hydraulic pressure within their respective brake cylinders 57. The fluid alternately supplied to and released from cylinders 57 is conveyed by hydraulic brake line 58.

Figure 4:
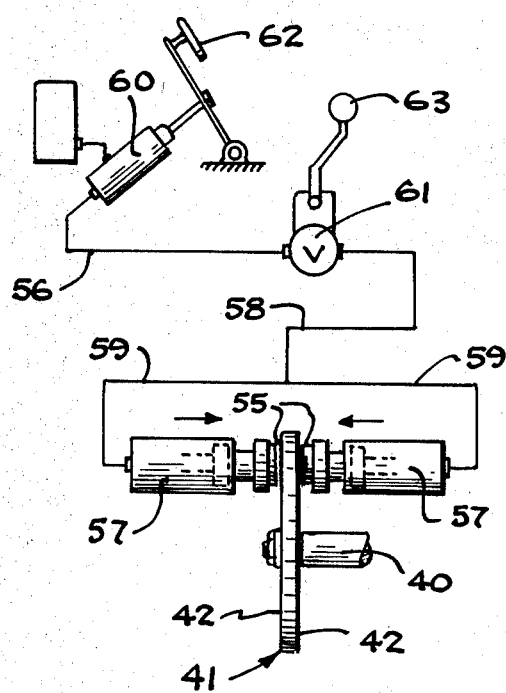
FIG. 4 is a schematic diagram illustrating a hydraulic braking system used in accordance with this invention.

FIG. 4 schematically illustrates a hydraulic braking system. The brake disc 41 is fixed to shaft 40 and therefore rotates with shaft 40. The peripheral portion of the brake disc moves between opposing pressure elements 55. These elements can generate friction along the lateral or face surfaces 42 of brake disc 41 as a result of hydraulic pressure within brake cylinders 57. The brake cylinders 57 are in hydraulic communication with master cylinder 60 by means of brake line 58 and branch brake lines 59. The tightly closing valve 61, e.g. a gate valve, located in hydraulic line 58 permits interruption of the hydraulic communication between brake cylinders 57 and master cylinder 60. The piston (not shown) within the master cylinder 60 is driven by foot pedal 62. This provides the pressure within the hydraulic system which results in the thrusting of friction elements 55 into friction contact with brake disc 41. Upon release of pressure on the pedal 62, resilient means (not shown) return the pedal to its nonbraking position, causing return of hydraulic fluid to the master cylinder 60 and release of thrust of elements 55. However, tight closing valve 61 is operated manually by handle 63. Hence, while the hydraulic line 58 is under braking pressure closing of the valve 61 permits locking of the friction elements in their braking condition.

OPERATION OF SLEWING BRAKE

While turntable 11 is in slewing motion, i.e. rotational movement around its axis, spur gear 35, which is in mesh with stationary circular gear 14, rotates. This causes rotation of shaft 30 to which spur gear 35 is fixed and with it causes rotation of worm wheel gear 33 which is also attached to shaft 30. Rotation of the worm wheel 33 causes rotation of worm gear 35 and shaft 40 to which worm gear 35 is attached. As shaft 40 rotates, so also does brake disc 41 which is fixed to shaft 40. Hence, to slow down or stop the rotation of turntable 11 in accordance with the use of this invention, pressure is applied to foot pedal 62 thereby thrusting opposing friction elements 55 against the lateral surfaces 42 of brake disc 41. This opposes the rotation of shaft 40 and worm gear 35, and worm wheel gear 33. Hence, the rotation of shaft 30 is also opposed with the ultimate result that the rotation of gear 35 is smoothly retarded as a result of the braking forces applied to brake disc 41. As the rotation of spur gear 35 is smoothly slowed, so also is the rotation of turntable 11 around its axis since spur gear 35 meshes with stationary gear 14.

It will be appreciated that in accordance with this invention brake disc 41 is geared to the stationary element 14 with high mechanical advantage; also it is essential that the gearing therebetween be of sufficiently low ratio that the system does not become self-locking with respect to forces applied to it from spur gear 35. When in accordance with a preferred embodiment of this invention, which is specifically illustrated in the drawings, a worm gear is used in the gearing system, the lead angle of the worm gear must be sufficiently steep to permit the shaft 40 to be driven as a result of driving forces applied by the rotation or slewing motion of the turntable. Naturally, the exact range of usable lead angles on such a worm gear will depend on the particular dimensions of the elements coacting therewith, on the amount of lubrication provided, on the amount of vibration present, and other variables. We have found that worm gears having thread lead angles as low as 9° are eminently satisfactory for use in accordance with this invention. Worm gears having lead angles of 5° or less do not provide a smooth coast, and hence their use is not in accordance with this invention. Use of a worm gear having 10° 27' lead angle in accordance with a preferred embodiment of this invention permits the turntable to coast smoothly after the motor-derived driving forces terminate. This permits the application of braking forces on brake disc 41 while it is being driven by the momentum of the rotating turntable 11 and boom 15.

Hence, in accordance with this invention the braking forces applied at disc 41 have a high mechanical advantage with respect to the slowing of the slewing of the turntable. Thus, in accordance with this invention the slewing motion may be smoothly and precisely controlled.

It is commercially important (costwise) thought not in theory essential that the brake system of this invention be part of the turntable slewing-drive mechanism. It is essential that the turntable be free of attachment to any mechanism which is self-locking with respect to slewing motion of the turntable.

We claim:

1. In a rotatable crane having a stationary base structure with a boom and a turntable mounted thereon, said turntable being capable of coasting, slewing motion, said crane having drive gearing means for operatively connecting said rotatable turntable with said stationary base, the improvement comprising: a rotatable braking element operatively connected to said drive gearing means; nonrotative braking means operable by the operator and responsive in accordance with the force he exerts for opposing the rotation of the rotatable braking element but normally biased to a nonbraking position; said drive gearing means having a gear ratio sufficiently high to provide high mechanical advantage, and below a self-locking ratio but sufficiently low to permit said braking element to be rotated as a result of the coasting slewing motion of the turntable.

2. An apparatus as in claim 1 in which said drive gearing means includes a worm gear having a thread lead angle greater than 9°.

3. The apparatus of claim 1 in which said gearing includes a worm gear having a thread lead angle of about 11°.

4. An improved slewing-motion control apparatus for use in a rotatable boom crane comprising a relatively large circular spur gear which constitutes part of the means for swinging the crane, the center of said gear being the axis of rotation of the crane; a small spur gear in mesh with the stationary gear; a control mechanism output shaft; a control mechanism input shaft; nonself-locking gearing connecting said output shaft and input shaft; a slewing-drive motor; and a brake disc; the small spur gear being fixed to the output shaft, the control mechanism input shaft being operatively connected to the slewing-drive motor and to said brake disc, said brake disc being operated by a hydraulic system which includes a master cylinder, a foot pedal operating said master cylinder, and a manually operated tightly closing valve for interrupting the hydraulic connection between the brake disc and the master cylinder, said gearing including a worm gear on said input shaft, said worm gear having a thread lead angle greater than 9°, said gearing providing a gear ratio between the input shaft and output shaft of between 8 to 1 and 30 to 1, whereby the momentum of the coasting slewing-motion of the turntable and boom causes the small spur gear to rotate and with it the output shaft, the gearing, the control mechanism input, and brake disc to rotate; and means to apply friction forces to the brake disc to oppose rotation of the control mechanism input shaft, the gearing, the output shaft and the small spur gear, thereby smoothly and reliably controlling the rotation of the crane.

5. In combination with a crane turntable for swinging a crane boom, a stationary ring gear, and a pinion meshing with the ring gear for turning the turntable, means for driving the pinion including a worm wheel rotating with the pinion, a worm driving the worm wheel, and a motor turning the worm; a brake disc turning with the worm; and nonrotative hydraulic brake means, operable by the operator and responsive in accordance with the force he exerts for braking the disc, but normally biased in nonbraking position; said worm wheel and worm providing a high mechanical advantage in the range between 8 to 1 and 30 to 1, said worm having a sufficient lead angle to permit reliable smooth coasting when the brake disc and motor are free to turn under the influence of the momentum of the turntable and boom.

6. In combination with a crane turntable for swinging a crane boom, a ring gear, and a pinion meshing with the ring gear for turning the turntable, means for driving the pinion including a worm wheel rotating with the pinion, a worm driving the worm wheel, and a motor turning the worm; a brake rotor turning with the worm; and nonrotative hydraulic brake means operable by the operator and responsive in accordance with the force he exerts, for braking the rotor but normally biased in a nonbraking position; said worm wheel and worm providing a high mechanical advantage in the range between 8 to 1 and 30 to 1, and said worm having sufficient lead angle to permit reliable smooth coasting when the brake rotor and motor are free to turn under the influence of the momentum of the turntable and boom.